US012673596B2

(12) United States Patent
    Kuczynski et al.

(10) Patent No.: US 12,673,596 B2
(45) Date of Patent: Jul. 7, 2026

(54) OCCUPANT SUPPORT STRUCTURE WITH DYNAMICALLY RESPONSIVE SUPPORT MEMBER

(71) Applicant: GM GLOBAL TECHNOLOGY OPERATIONS LLC, Detroit, MI (US)

(72) Inventors: Edward Thaddeus Kuczynski, Ann Arbor, MI (US); Daniel W. Booth, Bloomfield Hills, MI (US); Bonita J. Thomas, Linden, MI (US); Jill M. Green, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 131 days.

(21) Appl. No.: 18/750,858

(22) Filed: Jun. 21, 2024

(65) Prior Publication Data

US 2025/0388159 A1      Dec. 25, 2025

(51) Int. Cl.
B60N 2/90          (2018.01)

(52) U.S. Cl.
CPC ..................................... B60N 2/914 (2018.02)

(58) Field of Classification Search
CPC ...................................................... B60N 2/914
USPC ....... 297/284.1, 284.2, 284.3, 284.6, 284.11, 297/DIG. 10
See application file for complete search history.

(56) References Cited

U.S. PATENT DOCUMENTS

| | | |
|---|---|---|
| 8,863,320 B2 | 10/2014 | Kelly et al. |
| 9,504,598 B2 | 11/2016 | Mazzucchelli |
| 10,039,338 B2 | 8/2018 | Kelly et al. |
| 11,312,278 B2 | 4/2022 | Mazzucchelli |
| 2014/0138196 A1 | 5/2014 | Mazzucchelli |
| 2014/0239677 A1* | 8/2014 | Laib .................. B64D 11/0626 |
| | | 297/180.1 |
| 2016/0008159 A1 | 1/2016 | Mazzucchelli |
| 2020/0238874 A1 | 7/2020 | Mazzucchelli |

(Continued)

FOREIGN PATENT DOCUMENTS

| | | |
|---|---|---|
| DE | 19844307 A1 | 9/1999 |
| DE | 69429177 T2 | 6/2002 |

(Continued)

OTHER PUBLICATIONS

German Office Action from counterpart DE1020241233028, dated Apr. 4, 2025.

*Primary Examiner* — Justin V Lewis

(57)              ABSTRACT

An occupant support structure of a vehicle defines an occupant support surface configured to contact and support an occupant of the vehicle and includes a dynamically responsive support member positioned adjacent the occupant support surface such that forces exerted on the occupant support surface are transferred to the support member. The support member includes a bladder and a support body encapsulated in an interior chamber defined by the bladder. The support body is made of a resilient compressible material having interconnected open pores. The bladder includes an aperture that provides a passage for fluid communication between the interior chamber thereof and an ambient environment. The aperture in the bladder is configured to passively control and limit the rate of fluid release from the bladder in response to a pressure differential between the fluid in the interior chamber of the bladder and that in the ambient environment.

18 Claims, 1 Drawing Sheet

(56)  References Cited

U.S. PATENT DOCUMENTS

2022/0274516 A1* 9/2022 Withey .................. B60N 2/002
2023/0404843 A1 12/2023 Mazzucchelli

FOREIGN PATENT DOCUMENTS

DE       102004027437 A1    7/2005
DE       102018104584 A1    9/2018

* cited by examiner

OCCUPANT SUPPORT STRUCTURE WITH DYNAMICALLY RESPONSIVE SUPPORT MEMBER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to occupant support structures for transportation applications and, more particularly to occupant support structures with dynamically response support members configured to restrain movement of occupants in response to high acceleration or deceleration events.

Vehicle seats typically include a seat bottom cushion, a seat back cushion configured to pivot relative to the seat bottom cushion, and a head rest or head restraint mounted at a top or upper end of the seat back. The seat bottom cushion, seat back cushion, and/or head rest of a vehicle seat may be designed to help absorb and dissipate loads applied thereto during high acceleration (or deceleration) events, such during a front end or rear end collision.

SUMMARY

A vehicle, in accordance with one or more embodiments of the present disclosure, comprises a vehicle body defining a cabin and an occupant support structure disposed within the cabin. The occupant support structure defines an occupant support surface configured to contact and support an occupant of the vehicle. The occupant support structure comprises a dynamically responsive support member positioned adjacent the occupant support surface such that forces exerted on the occupant support surface are transferred to the support member. The support member comprises a support body and a bladder. The support body is made of a resilient compressible material having interconnected open pores. The bladder defines an interior chamber and the support body is encapsulated in the interior chamber of the bladder. The bladder comprises at least one aperture that provides a passage for fluid communication between the interior chamber of the bladder and an ambient environment. The at least one aperture in the bladder is configured to passively control and limit the rate of fluid release from the bladder in response to a pressure differential between the fluid in the interior chamber of the bladder and that in the ambient environment.

The at least one aperture in the bladder may be configured to passively control and limit the rate of fluid release from the bladder such that a positive correlation exists between the magnitude of a load applied to the support member, the pressure differential between the fluid in the interior chamber of the bladder and in the ambient environment, and a compression resistance of the support member.

The at least one aperture in the bladder may be configured to allow substantially uninhibited fluid release from the bladder in response to relatively low loads applied thereto such that a pressure differential between the fluid in the interior chamber of the bladder and in the ambient environment is minimized. At the same time, the at least one aperture in the bladder may be configured to function as a bottleneck that limits fluid release from the bladder in response to relatively high loads applied thereto such that a pressure differential between the fluid in the interior chamber of the bladder and in the ambient environment is maximized.

When the fluid pressure in the interior chamber of the bladder is substantially equal to that of the ambient environment, the support member may have a first compression resistance and, when the fluid pressure in the interior chamber of the bladder is greater than that of the ambient environment, the support member may have a second compression resistance greater than the first compression resistance.

The support body may be made of open cell foam.

The support body may have a compression stress/strain characteristic of greater than or equal to 3 kilopascals and less than or equal to 12 kilopascals, as measured by International Standard ISO 3386/1.

The at least one aperture in the bladder may comprise a valve coupled to the bladder. In such case, the valve may be configured to transition from a closed position to an open position in response to a pressure differential between the fluid in the interior chamber of the bladder and in the ambient environment.

The at least one aperture may comprise (i) an opening in the bladder with a fixed size and shape that does not change in response to a pressure differential between the fluid in the interior chamber of the bladder and in the ambient environment, and/or (ii) a discontinuity in the bladder with a variable size and/or shape that is configured to transition from a closed position to an open position in response to a pressure differential between the fluid in the interior chamber of the bladder and in the ambient environment.

The support body may have a three-dimensional shape, and the bladder may substantially conform to the three-dimensional shape of the support body.

The support member may be configured to control or restrain movement of an occupant in response to multidirectional loads applied to the occupant support surface of the occupant support structure by the occupant.

The vehicle may further comprise a vehicle seat. In such case, the occupant support may be a seat bottom cushion, a seat back cushion, or a head rest of the vehicle seat.

The occupant support structure may further comprise a cover and a padding disposed between the cover and the support member, wherein the cover defines the occupant support surface.

A vehicle seat, in accordance with one or more embodiments of the present disclosure, comprises an occupant support structure. The occupant support structure defines an occupant support surface configured to contact and support an occupant. The occupant support structure comprises a dynamically responsive support member, a padding, and a cover. The dynamically responsive support member is positioned adjacent the occupant support surface such that forces exerted on the occupant support surface are transferred to the support member. The padding extends over the support member. The cover defines the occupant support surface and extends over the padding and over the support member such that the padding is disposed between the support member and the cover. The support member comprises a support body and a bladder. The support body is made of a resilient compressible material having interconnected open pores. The bladder defines an interior chamber and the support body is encapsulated in the interior chamber of the bladder. The bladder comprises at least one aperture that provides a passage for fluid communication between the interior chamber of the bladder and an ambient environment. The at least one aperture in the bladder is configured to passively control and limit the rate of fluid release from the bladder in response to a pressure differential between the fluid in the interior chamber of the bladder and that in the ambient environment.

When the fluid pressure in the interior chamber of the bladder is substantially equal to that of the ambient environment, the support member may have a first compression resistance and, when the fluid pressure in the interior chamber of the bladder is greater than that of the ambient environment, the support member may have a second compression resistance greater than the first compression resistance.

The at least one aperture in the bladder may be configured to allow substantially uninhibited fluid release from the bladder in response to relatively low loads applied thereto such that a pressure differential between the fluid in the interior chamber of the bladder and in the ambient environment is minimized. At the same time, the at least one aperture in the bladder may be configured to function as a bottleneck that limits fluid release from the bladder in response to relatively high loads applied thereto such that a pressure differential between the fluid in the interior chamber of the bladder and in the ambient environment is maximized.

The support body may have a three-dimensional shape, and the bladder may substantially conform to the three-dimensional shape of the support body. The support member may be configured to control or restrain movement of an occupant in response to multidirectional loads applied to the occupant support surface of the occupant support structure by the occupant.

In aspects, the occupant support structure may be a seat bottom cushion. In such case, the shape of the support member may be configured such that, in response to relatively high applied loads, the support member functions as an anti-submarining device and restrains movement of a pelvis of an occupant of the vehicle seat.

In aspects, the occupant support structure may be a seat back cushion. In such case, the shape of the support member may be configured such that, in response to relatively high applied loads, the support member functions to restrain movement of the shoulders of an occupant of the vehicle seat.

In aspects, the occupant support structure may be a head rest. In such case, the shape of the support member may be configured such that, in response to relatively high applied loads, the support member functions to restrain movement of a head of an occupant of the vehicle seat.

The support body may comprise an open cell foam comprising polyurethane, polyethylene terephthalate, or a combination thereof. The bladder may comprise a substantially fluid-impermeable thermoplastic polyurethane material.

The cover may comprise leather, cotton, polyester, vinyl, or a combination thereof. The padding may comprise polyurethane foam.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figures 1, 2:
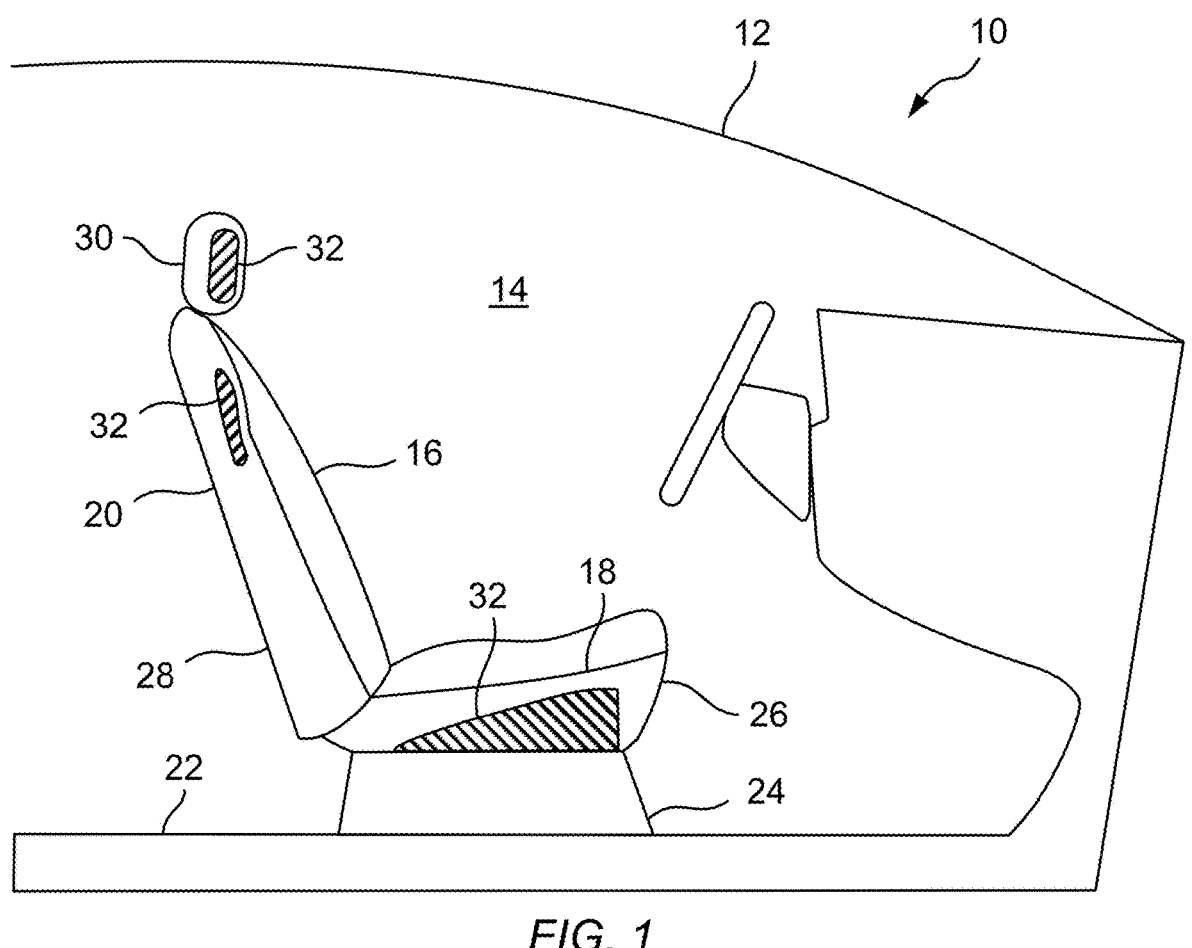
FIG. 1 is a partial side cross-sectional view of vehicle seat positioned in a cabin of a vehicle, the vehicle seat including three occupant support structures respectively defined by a seat bottom cushion, a seat back cushion, and a head rest of the vehicle seat, with each occupant support structure having an occupant support surface configured to contact and support an occupant in the cabin of the vehicle.
FIG. 2 is a partial side cross-sectional view of the occupant support structure defined by the seat bottom cushion of the vehicle seat of FIG. 1, the occupant support structure comprising a dynamically responsive support member, a padding overlying the support member, and a cover overlying the padding and the support member.

The presently disclosed dynamically responsive support member is configured to be relatively soft and compliant with subjected to relatively low applied loads and to be relatively hard and resistant to compression when subjected to relatively high applied loads. As such, the presently disclosed dynamically responsive support member can be included in an occupant support structure of a vehicle to provide the occupant support structure with a relatively soft, compliant feel during normal occupant use to provide comfort to an occupant and, at the same time, to provide the occupant support structure with the ability to resist compression in response to relatively high loads (e.g., during high acceleration or deceleration of the vehicle, such as during a collision) to help restrain movement of the occupant and thereby improve the safety of the occupant.

The dynamically responsive properties of the support member are enabled by the specific configuration of the support member, which comprises a porous support body and a bladder encapsulating the support body, with the bladder having at least one aperture that allows and controls fluid transfer between an interior chamber defined by the bladder and an ambient environment. The configuration of the support member allows the three-dimensional shape of the support member to be readily tailored to suit the needs of a variety of different use applications. The three-dimensional shape of the support member may be selected so that, in response to a relatively high applied load, the shape of the support member allows the support member to effectively restrain an occupant from moving in a certain direction and/or effectively direct the occupant or a portion thereof to move in a desired direction. In aspects, the three-dimensional shape of the support member may be selected so that, in response to a relatively high applied load, the support member functions as an anti-submarining device, a shoulder restraint, or a head restraint.

FIG. 1 depicts a portion of an automotive vehicle 10 comprising a vehicle body 12 defining a cabin 14 and an occupant support structure 16 disposed within the cabin 14 and defining an occupant support surface 18 configured to contact and support an occupant in the cabin 14. In FIG. 1, the occupant support structure 16 and the occupant support surface 18 are defined by a vehicle seat 20 disposed within the cabin 14 and mounted to a floor 22 of the vehicle body 12. The vehicle seat 20 comprises a base 24, a seat bottom cushion 26, a seat back cushion 28, and a head rest 30. In embodiments, the occupant support structure 16 and the occupant support surface 18 may be defined by the seat bottom cushion 26, the seat back cushion 28, and/or the head rest 30 of the vehicle seat 20. In other embodiments, the occupant support structure 16 and the occupant support surface 18 may be defined by another component of the vehicle 10 disposed within the cabin 14 and configured to contact and support an occupant in the vehicle 10. Although not shown in the drawings, the occupant support structure 16 disclosed herein may be used in other transportation applications, e.g., motorcycles, boats, tractors, buses, mobile homes, campers, tanks, and/or aircraft.

Referring now to FIG. 2, the occupant support structure 16 comprises a dynamically responsive support member 32, a padding 34 overlying the support member 32, and a cover 36 overlying the padding 34 and the support member 32. The cover 36 defines the occupant support surface 18 and is configured to contact and support an occupant disposed on or in contact with the occupant support structure 16. The cover 36 may be made of any material that can provide the occupant support structure 16 with wear-resistance and optionally a desirable appearance. Examples of materials that may be used to form the cover 36 include leather, cotton, synthetic polymers (e.g., polyester and/or vinyl), and combinations thereof. The padding 34 is disposed between the cover 36 and the support member 32 and is configured to provide the occupant support structure 16 with a soft, compliant feel to provide comfort to an occupant. In aspects, the padding 34 may be made of polyurethane foam. Additional layers and/or materials may be disposed between the cover 36 and the support member 32, if desired, for example, to improve the comfort, support, and/or safety of an occupant in contact with the occupant support structure 16.

The support member 32 is configured to support an occupant positioned on or otherwise in contact with the occupant support surface 18 of the occupant support structure 16 and to control or restrain movement of such occupant in the event the vehicle 10 experiences a sudden change in acceleration, such as during a front end or rear end collision. The support member 32 is positioned within the occupant support structure 16 such that the support member 32 is located adjacent to and in indirect contact with the occupant support surface 18 such that forces exerted on the occupant support surface 18 are transferred to the support member 32 (e.g., via the padding 34).

The support member 32 comprises a support body 40 having a three-dimensional shape and a bladder 42 encapsulating the support body 40. The shape of the bladder 42 may be in substantial conformance with the three-dimensional shape of the support body 40 and may define an outer surface 38 of the support member 32. In aspects, the bladder 42 may be physically bonded to the support body 40. The construction of the support member 32, including the three-dimensional shape of the support body 40 and the conformal nature of the bladder 42, allows the support member 32 to be formed into a variety of three-dimensional shapes and used to control or restrain movement of an occupant in response to loads that are applied to the support member 32 from a single predetermined direction and/or from loads that may be applied to the support member 32 from multiple different directions.

The specific configuration of the support member 32 may depend on the application in which the occupant support structure 16 (including the support member 32) is used. For example, in embodiments where the occupant support structure 16 is in the form of a seat bottom cushion 26 of a vehicle seat 20, the support member 32 may be configured to function as an anti-submarining device and may be in the shape of forward-facing, upwardly-inclined ramp, for example, as shown in FIGS. 1 and 2. In such case, if an occupant of the vehicle seat 20 is pressed into the seat bottom cushion 26 during a collision, the upwardly-inclined ramp defined by the support member 32 may restrain movement of the pelvis of the occupant and thereby prevent the occupant from slipping out from under a lap belt (not shown), thereby reducing the risk of injury to the occupant. As another example, in embodiments where the occupant support structure 16 is in the form of a seat back cushion 28 of a vehicle seat 20, the support member 32 may be configured to restrain movement of the shoulders and/or upper torso of the occupant and thereby prevent the occupant from sliding upwardly along the seat back cushion 28 away from the seat bottom cushion 26 during a rear collision. As another example, in embodiments where the occupant support structure 16 is in the form of a head rest 30 of a vehicle seat 20, the support member 32 may be configured to restrain movement of the head of the occupant and thereby prevent the occupant from experiencing whiplash.

The support body 40 is made of a resilient compressible material having interconnected open pores configured to contain a fluid (e.g., air). For example, the support body 40 may be made of a low-density flexible open cell foam. The support body 40 may comprise a polymer, e.g., polyurethane, polyethylene terephthalate (PET), or a combination thereof. Notably, the support body 40 is preferably substantially free of polypropylene (e.g., expanded polypropylene) and/or metal, which are relatively hard materials oftentimes used in vehicle applications to provide rigidity and shock-absorbing properties to occupant support structures, e.g., in the event of a collision. The support body 40 may be made of the same material or a different material than that of the padding 34. The support body 40 (and optionally the padding 34) may have a density of less than or equal to 250 kilograms per cubic meter (kg/m$^3$) and a compression stress/strain characteristic (CC) of greater than or equal to 3 kilopascals (kPa) and less than or equal to 12 kPa, as measured by International Standard ISO 3386/1. The compression stress/strain characteristic is a measure of the load-bearing properties of a material and the material's resistance to compression in response to an applied force or load, with greater compression stress/strain characteristic values corresponding to greater resistance to compression.

The bladder 42 defines an interior chamber 43 in which the support body 40 is encapsulated. The bladder 42 is configured to control or adjust the compression resistance of the support member 32 in response to an applied force or load by controlling the rate at which a fluid can be expelled from the open pores of the support body 40 and from the bladder 42. The bladder 42 is made of a thin flexible material that is substantially impermeable to fluid and includes at least one aperture 44 that provides a passage for fluid communication between an interior chamber of the bladder 42 and an ambient environment. In aspects, the bladder 42 may be made of a thermoplastic material, e.g., thermoplastic polyurethane. The bladder 42 may have a thickness of greater than or equal to 0.5 millimeters (mm) and less than or equal to 5 millimeters, optionally less than or equal to 3 millimeters, or optionally less than or equal to 2 millimeters.

Under static conditions, the fluid pressure in the bladder 42 (and in the open pores of the support body 40) is substantially equal to that of the ambient environment and the compression resistance of the support member 32 is substantially equal to the inherent compression resistance of the resilient compressible material of the support body 40. Under dynamic conditions, when a load is applied to the occupant support surface 18 and transferred to the support member 32, the fluid pressure in the open pores increases. The difference between the fluid pressure in the open pores of the support body 40 and that in the ambient environment initiates fluid flow and the expulsion of fluid from the bladder 42 (and from the open pores of the support body 40) to the ambient environment via the at least one aperture 44 in the bladder 42 until the fluid pressure in the bladder 42 is substantially equal to that of the ambient environment. The greater the magnitude of the load applied to the support member 32, the greater the increase in fluid pressure in the bladder 42. Prior to reaching equilibrium, when the pressure in the bladder 42 is greater than that of the ambient environment, the compression resistance of the support member 32 will be greater than the inherent compression resistance of the resilient compressible material of the support body 40. The support body 40 is configured such that a positive correlation exists between the magnitude of a load applied to the support member 32, the pressure differential between the fluid in the bladder 42 and that in the ambient environment, and the compression resistance of the support member 32. The greater the load applied to the support member 32, the greater the pressure differential created between the fluid in the bladder 42 and that in the ambient environment, and the greater the compression resistance of the support member 32.

The at least one aperture 44 in the bladder 42 is configured to allow substantially uninhibited fluid release from the bladder 42 in response to relatively low applied loads and, at the same time, to function as a bottleneck that limits the rate of fluid release from the bladder 42 in response to relatively high loads. More specifically, the configuration of the at least one aperture 44 in the bladder 42 is selected so that, when a relatively high load is applied to the support member 32 (e.g., during a collision), the rate at which fluid is expelled from the bladder 42 is sufficiently limited to provide the support member 32 with a relatively high resistance to compression. In addition, the, configuration of the at least one aperture 44 in the bladder 42 is selected so that, when a relatively small load is applied to the support member 32 (e.g., during normal occupant movement and contact with the occupant support structure 16), the rate at which fluid is expelled from the bladder 42 is substantially uninhibited and the compression resistance of the support member 32 is substantially equal to the inherent compression resistance of the resilient compressible material of the support body 40. As such, when a relatively small load is applied to the support member 32, the support member 32 has relatively low resistance to compression and the occupant support structure 16 feels relatively soft and compliant to an occupant. In other words, the support body 40 and the bladder 42 together provide the support member 32 and the occupant support structure 16 with the ability to restrain movement of an occupant in response to relatively high applied loads (e.g. during a collision) to increase the safety of the occupant, while also providing the occupant support structure 16 with a soft compliant feel during normal use of the occupant support structure 16 to increase the comfort of the occupant.

The at least one aperture 44 in the bladder 42 is configured such that the rate at which a fluid is expelled from the bladder 42 is passively controlled in response to a pressure differential between the fluid in the bladder 42 and that in the ambient environment. In other words, the at least one aperture 44 in the bladder 42 is configured such that the fluid pressure in the bladder 42 and the compression resistance of the support member 32 can be passively controlled during a collision event, without the use of an electronic control device, electric input signal, or fluid pump. The specific configuration of the at least one aperture 44 is not limited so long as fluid (e.g., air) can be expelled from the bladder 42 via the at least one aperture 44 at a desired rate in response to relatively high and low applied loads. In aspects, the at least one aperture 44 may be in the form of one or more valves coupled to the bladder 42 that can control the flow rate of fluid expelled from the bladder 42 by opening, closing, or partially obstructing fluid flow. In aspects, the at least one aperture 44 may be in the form of a plurality of openings, perforations, or voids in the material of the bladder, with each of the openings, perforations, or voids having a substantially fixed size and shape that does not change in response to a pressure differential between the fluid in the bladder 42 and that in the ambient environment. Additionally or alternatively, the at least one aperture 44 may be in the form of a plurality of discontinuities, slits, or other perturbances in the material of the bladder that have a variable size and/or shape and that are capable of transitioning from a closed position to an open position in response to a pressure differential between the fluid in the bladder 42 and that in the ambient environment.

The support body 40 may be formed by a foam in place process in which a precursor material is injected into a mold and expanded within the mold to produce an open cell foam. In aspects, the material of the bladder 42 may be placed inside the mold prior to injecting the precursor material into the mold so that the support body 40 and the bladder 42 are formed together into the shape of the support member 32. In aspects, the support body 40 and the bladder 42 may be physically bonded to each other during the foam in place process. In embodiments where the bladder 42 is made of a thermoplastic material, a fluid-tight seal may be formed around the support body 40 by the bladder 42 during the foam in place process by heating the material of the bladder 42 to fuse portions of the bladder 42 together.

In aspects, the at least one aperture 44 may be formed in the bladder 42 after completion of the foam in place process, which may allow a vacuum to be applied to the mold to ensure good contact between the bladder 42 and the interior surface of the mold and to ensure that the support body 40 and the bladder 42 fill and conform to the shape of the mold. The at least one aperture 44 may be formed in the bladder 42, for example, by punching or cutting holes and/or slits in the material of the bladder 42.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle comprising:
a vehicle body defining a cabin; and
an occupant support structure disposed within the cabin and defining an occupant support surface configured to contact and support an occupant of the vehicle, the occupant support structure comprising a dynamically responsive support member positioned adjacent the occupant support surface such that forces exerted on the occupant support surface are transferred to the support member,
wherein the support member comprises:
a support body made of a resilient compressible material having interconnected open pores, and
a bladder defining an interior chamber and encapsulating the support body in the interior chamber, the bladder comprising at least one aperture configured to allow fluid transfer between the interior chamber of the bladder and an ambient environment,
wherein the at least one aperture in the bladder is configured to passively control and limit a rate of fluid release from the bladder in response to a pressure differential between the interior chamber of the bladder and the ambient environment such that a positive correlation exists between a load applied to the support member, the pressure differential between the interior chamber of the bladder and the ambient environment, and a compression resistance of the support member.

2. The vehicle of claim 1, wherein, when a first load is applied to the bladder, the at least one aperture in the bladder is configured to allow substantially uninhibited fluid release from the bladder such that a pressure differential between the interior chamber of the bladder and the ambient environment is minimized, and, when a second load greater than the first load is applied to the bladder, the at least one aperture in the bladder is configured to function as a bottleneck that limits fluid release from the bladder such that a pressure differential between the interior chamber of the bladder and the ambient environment is maximized.

3. The vehicle of claim 1, wherein, when the pressure in the interior chamber of the bladder is substantially equal to the pressure of the ambient environment, the support member has a first compression resistance and, when the pressure in the interior chamber of the bladder is greater than the pressure of the ambient environment, the support member has a second compression resistance greater than the first compression resistance.

4. The vehicle of claim 1, wherein the support body is made of open cell foam, and wherein the support body has a compression stress/strain characteristic of greater than or equal to 3 kilopascals and less than or equal to 12 kilopascals.

5. The vehicle of claim 1, wherein the at least one aperture comprises a valve coupled to the bladder, and wherein the valve is configured to transition from a closed position to an open position in response to a pressure differential between the interior chamber of the bladder and the ambient environment.

6. The vehicle of claim 1, wherein the at least one aperture comprises (i) an opening in the bladder with a fixed size and shape that does not change in response to a pressure differential between the interior chamber of the bladder and the ambient environment, and/or (ii) a discontinuity in the bladder with a variable size and/or shape that is configured to transition from a closed position to an open position in response to a pressure differential between the interior chamber of the bladder and the ambient environment.

7. The vehicle of claim 1, wherein the support body has a three-dimensional shape, and wherein the bladder substantially conforms to the three-dimensional shape of the support body.

8. The vehicle of claim 7, wherein the support member is configured to control or restrain movement of an occupant in response to multidirectional loads applied to the occupant support surface of the occupant support structure by the occupant.

9. The vehicle of claim 1, further comprising a vehicle seat, and wherein the occupant support structure is a seat bottom cushion, a seat back cushion, or a head rest of the vehicle seat.

10. The vehicle of claim 1, wherein the occupant support structure further comprises a cover and a padding disposed between the cover and the support member, wherein the cover defines the occupant support surface.

11. A vehicle seat comprising:
an occupant support structure defining an occupant support surface configured to contact and support an occupant, the occupant support structure comprising:
a dynamically responsive support member positioned adjacent the occupant support surface such that forces exerted on the occupant support surface are transferred to the support member,
a padding extending over the support member, and
a cover defining the occupant support surface and extending over the padding and the support member such that the padding is disposed between the support member and the cover,
wherein the support member comprises:
a support body made of a resilient compressible material having interconnected open pores configured to contain a fluid, and
a bladder defining an interior chamber and encapsulating the support body in the interior chamber, the bladder comprising at least one aperture configured to allow fluid transfer between the interior chamber of the bladder and an ambient environment,
wherein the at least one aperture in the bladder is configured to passively control and limit a rate of fluid release from the bladder in response to a pressure differential between the interior chamber of the bladder and the ambient environment, and
wherein, when the pressure of the interior chamber of the bladder is substantially equal to the pressure of the ambient environment, the support member has a first compression resistance and, when the pressure of the interior chamber of the bladder is greater than the pressure of the ambient environment, the support member has a second compression resistance greater than the first compression resistance.

12. The vehicle seat of claim 11, wherein, when a first load is applied to the bladder, the at least one aperture in the bladder is configured to allow substantially uninhibited fluid release from the bladder such that a pressure differential between the fluid in the interior chamber of the bladder and in the ambient environment is minimized, and, when a second load greater than the first load is applied to the bladder, the at least one aperture in the bladder is configured to function as a bottleneck that limits fluid release from the bladder such that a pressure differential between the fluid in the interior chamber of the bladder and in the ambient environment is maximized.

13. The vehicle seat of claim 11, wherein the support body has a three-dimensional shape, the bladder substantially conforms to the three-dimensional shape of the support body, and wherein the support member is configured to control or restrain movement of an occupant in response to multidirectional loads applied to the occupant support surface of the occupant support structure by the occupant.

14. The vehicle seat of claim 11, wherein the occupant support structure is a seat bottom cushion and the support member is configured such that, in response to an applied load, the support member functions as an anti-submarining device and restrains movement of a pelvis of an occupant of the vehicle seat.

15. The vehicle seat of claim 11, wherein the occupant support structure is a seat back cushion and the support member is configured such that, in response to an applied load, the support member functions to restrain movement of the shoulders of an occupant of the vehicle seat.

16. The vehicle seat of claim 11, wherein the occupant support structure is a head rest and the support member is configured such that, in response to an applied load, the support member functions to restrain movement of a head of an occupant of the vehicle seat.

17. The vehicle seat of claim 11, wherein the support body comprises an open cell foam comprising polyurethane, polyethylene terephthalate, or a combination thereof, and wherein the bladder comprises a substantially fluid-impermeable thermoplastic polyurethane material.

18. The vehicle seat of claim 11, wherein the cover comprises leather, cotton, polyester, vinyl, or a combination thereof, and wherein the padding comprises polyurethane foam.

* * * * *